United States Patent
Sedley

(10) Patent No.: US 7,100,833 B1
(45) Date of Patent: Sep. 5, 2006

(54) MECHANICAL DEVICE TO ENCODE MAGNETIC CARDS

(76) Inventor: Bruce S. Sedley, 2817 Milo Hae Loop, Koloa, HI (US) 96756

( * ) Notice: Subject to any disclaimer, the term of this patent is extended or adjusted under 35 U.S.C. 154(b) by 0 days.

(21) Appl. No.: 11/365,197

(22) Filed: Mar. 2, 2006

Related U.S. Application Data

(60) Provisional application No. 60/700,032, filed on Jul. 16, 2005.

(51) Int. Cl.
*G06L 7/00* (2006.01)

(52) U.S. Cl. .................................................... 235/486

(58) Field of Classification Search ................ 235/382, 235/382.5, 449, 436, 493; 340/825.34, 825.31; 70/276, 383, 384
See application file for complete search history.

(56) References Cited

U.S. PATENT DOCUMENTS

| | | | |
|---|---|---|---|
| 4,077,242 A | 3/1978 | Sedley | |
| 4,128,851 A | 12/1978 | Sedley | |
| 4,133,194 A | 1/1979 | Sedley | |
| 5,264,685 A | 11/1993 | Eisermamn | |
| 5,550,534 A * | 8/1996 | Myers | 235/449 |
| 6,474,121 B1 * | 11/2002 | Sakai et al. | 70/276 |
| 6,840,071 B1 * | 1/2005 | Sedley | 70/276 |

* cited by examiner

*Primary Examiner*—Thien M. Le
*Assistant Examiner*—Thien T. Mai
(74) *Attorney, Agent, or Firm*—Robert J. Lauson, Esq.; Lauson & Associates

(57) ABSTRACT

A fixture for magnetically coding a card key includes a front plate with areas for North and South magnetic polarity coding each with a number of holes, an optional code template having a lesser number of holes corresponding to selected holes in the front plate and attachable to the front plate, and North and South permanent magnet encoding tools sized to be inserted into the holes in the code template and front plate. The device further includes a card key holder preferably coupled to a tool holder and slidably connected to the fixture for placing the card key proximate the North or South area of the front plate and positioning the appropriate encoding tool for easy access. The device provides for convenient, accurate and error-free magnetic coding of card keys.

20 Claims, 5 Drawing Sheets

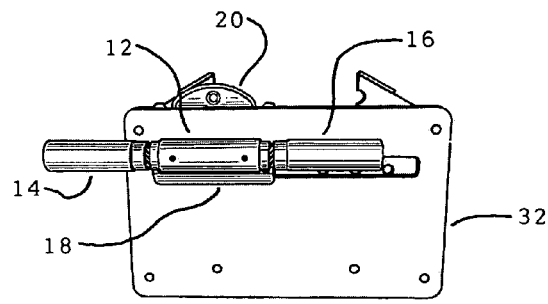
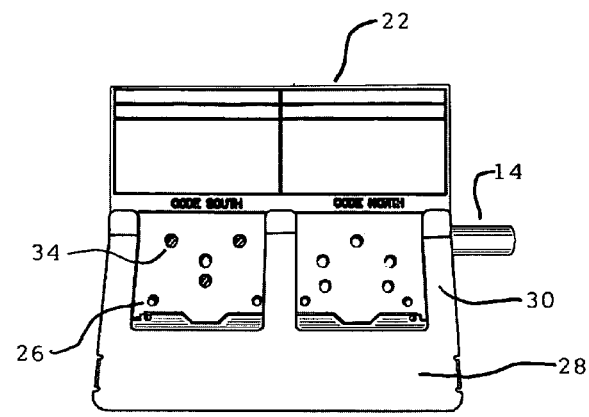
FIG. 5          FIG. 6
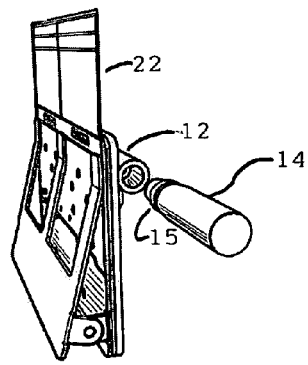
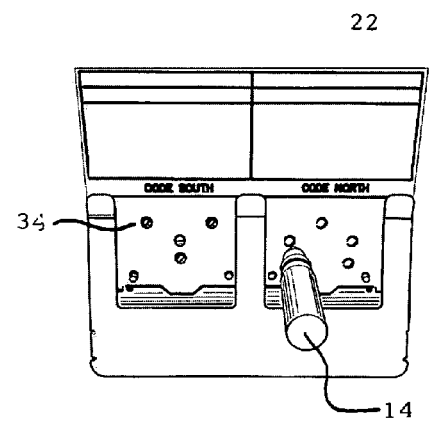
FIG. 7          FIG. 8

MECHANICAL DEVICE TO ENCODE MAGNETIC CARDS

CROSS REFERENCE TO RELATED DOCUMENTS

This application is based on provisional application Ser. No. 60/700,032 filed Jul. 16, 2005.

BACKGROUND OF THE INVENTION

Magnetic key cards such as described in Sedley U.S. Pat. No. 4,077,242 "Metal Magnetic Key" require a substantial amount of magnetic energy to encode discrete magnetic areas in specific locations to operate card locks that utilize magnetic pin tumblers to form the code of the lock, for example, the "Magnetic Key Operated Door Lock" as described in Sedley U.S. Pat. No. 4,133,194. The method that has been utilized for many years is an electronic device such as described in Sedley U.S. Pat. No. 4,128,851 "Hand Held Magnetic Encoder."

Developments of new permanent magnetic materials in recent years, such as Neodymium which has very strong magnetic properties, have been found to be of sufficient strength so that by forming a magnet of the proper size and simply touching it to the said magnetic key creates a magnetic area of sufficient strength to actuate the magnetic pin tumblers in a lock. As the permanent magnet has North and South opposing poles, the polarity of the magnetic area created on the key can be either North or South, depending on which end of the magnet was used to create the magnetized area on the key.

The advantage of using a device that can encode magnetic keys in this manner is that electric power does not have to be utilized for the encoding device, and the parts which often fail in those devices such as the electric switches that turn on the device or change its polarity are no longer a source of faulty encoding. When the electric encoding device is battery operated there has always been the problem that when the batteries become weak so does the resulting magnetic area on the key, and the person doing the encoding may not be aware that the code is not of sufficient strength, and the person to whom the key is issued is not able to unlock the lock using that key.

To encode a key with specific magnetic areas in the form of a code to actuate magnetic tumbler pins, the location of the area must be accurately made or the pin may not be moved out of locking position in the lock. A coding fixture such as described in the Sedley '851 patent is normally used into which the key to be encoded is manually placed behind a plate pierced with holes at the exact location where magnetic areas could be applied to the inserted key. The holes are sized to accept the tip of the encoding device which, when energized by the electronic circuit inside the device, creates a strong magnetic field of either North or South polarity which is transferred into the key at the location of the selected hole.

So that a record is made of where to encode the said magnetic areas on a card, a code template is first created which is a paper or plastic sheet on which is printed the pattern of the complete array of magnetic areas that could be encoded on a key for a particular type of magnetic lock or locks. Typically specific holes are punched out of this code template with a hole punch or other tool. In a preferred embodiment of such a code template, there are two identical array fields printed on the card side-by-side. The hole locations are numbered to identify which pin tumbler in the lock would be affected by a magnetic area of the key when said key is inserted into the card lock.

Typically one of the arrays of numbers is for encoding all the North magnetic areas and the other is used for encoding all the South areas. Using two separate areas reduces the potential error if both polarities were punched into one array and the person doing the encoding had to change the polarity while selecting holes in the card to be coded. Also it is easier to miss one or more holes while encoding in this way.

The use of such a card with two arrays of numbers along with a code fixture that has only a single key slot for insertion of the key to be coded, however, requires that the code template card be moved after encoding the first polarity section so that the second array overlays the key to be encoded and then those areas can be encoded on the key.

OBJECTS OF THE INVENTION

It is a purpose of this invention to eliminate the need for the electronic coding device and use instead permanent magnets to encode the key.

It is a further purpose of the invention to provide an improved coding fixture into which the key is inserted for the encoding process.

It is a further purpose of the invention to provide means to accurately locate the key that has been inserted into the fixture into encoding position behind either the North or the South array of the code template and eliminate the need to move the code template during the encoding process.

It is a further purpose of the invention to provide means to hold the code template in place on the code fixture by a spring biased clip.

Another purpose of the invention is to combine into one device the permanent magnet tools used to encode the key and the code fixture into which the key to be coded is inserted.

It is a further purpose of the invention to make two permanent magnet tools, one that would only encode North magnetic areas and one that would only encode South magnetic areas.

Other advantages of the present invention will become apparent upon reviewing the following drawings and detailed description.

SUMMARY OF THE INVENTION

A device or fixture for magnetically coding a card key includes a front plate with an area for North magnetic polarity coding and an area for South magnetic encoding, and each with a relatively large number of holes, a code template having a smaller number of holes corresponding to selected holes in the front plate and attachable to the front plate, and North and South permanent magnet encoding tools sized to be inserted into the holes in the code template and front plate. The device further includes a card key holder moveably connected to the fixture for placing the card key proximate the North or South portion of the front plate. The fixture further preferably includes a magnetic encoding tool holder connected to the device for storing the permanent magnetic encoding tools when not in use, and the tool holder includes a magnet to attract and retain the encoding tools. Preferably the card key holder and the encoding tool holder are coupled together and slidably connected to the fixture.

When the card key holder is proximate the North portion of the front plate the North encoding tool protrudes out from the fixture for easy access, and such that when the card key holder is proximate the South portion of the front plate the South encoding tool protrudes out from the fixture for easy access. Preferably the encoding tools are color coded, e.g., blue for North polarity and red for South polarity. Preferably the fixture also includes a base plate located behind the front plate that is one color (e.g. blue) behind the holes in the North portion of the front plate and a different color (e.g. red) behind the holes in the South portion of the front plate. Finally, the fixture also preferably includes a clip connected to the device for attaching the code template to the front plate, and the clip in combination with the base plate functions as a stand to keep the fixture upright.

BRIEF DESCRIPTION OF THE SEVERAL VIEWS OF THE DRAWINGS

FIG. 5 is a rear view showing the slider moved to the position to encode North magnetic areas on the key;

FIG. 6 is a front view showing a code template with punched holes in position for encoding;

FIG. 7 is a side perspective view showing removing a magnet tool that will encode North magnetic areas on the inserted key; note it is color coded with a blue band around its barrel to identify it as being the North polarity;

FIG. 8 shows use of the magnet tool to encode one of the North magnet areas on the inserted card;

LISTING OF REFERENCE NUMERALS

Figure 1:
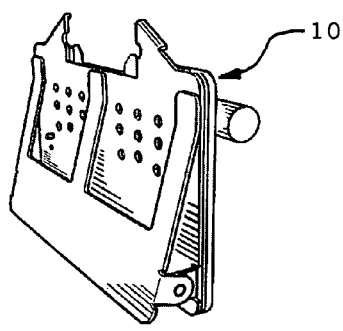
FIG. 1 is a front perspective view of the code fixture device of the present invention.

| | |
|---|---|
| code fixture device | 10 |
| tool holder or hollow tube | 12 |
| holder internal magnets | 13 |
| permanent magnet encoding tools | 14, 16 |
| color stripes on encoding tools | 15, 17 |
| sliding card holder section or slider | 18 |
| angle brackets | 19, 21 |

-continued

LISTING OF REFERENCE NUMERALS

| | |
|---|---|
| card key | 20 |
| code template | 22 |
| front plate | 24 |
| registration pins | 26 |
| spring clip | 28 |
| retaining arms | 30 |
| base plate | 32 |
| code template holes | 34 |
| base plate holes | 36 |

DESCRIPTION OF THE PREFERRED EMBODIMENT

First referring primarily to FIGS. 1–4, the code fixture device 10 includes a tool holder in the form of a hollow tube 12 for the two permanent magnet encoding tools 14, 16, which has been fitted with a permanent magnet 13 in its center so when the correct tool 14 or 16 is inserted in the tube 12 it is attracted to the internal magnet 13 and is retained in position. If the wrong tool 14 or 16 is inserted it is repelled by the internal magnet 13. In this manner it is only possible to place the tools 14, 16 in their respective tube 12 ends after use and for storage. The internal magnet 13 also serves as a "keeper" for the tools 14, 16 and tends to retain their magnetic strength.

The tube 12 with inserted tools 14, 16 is fixed to the sliding card holder section 18 of the code fixture 10 into which the key 20 is inserted for the purpose of encoding. Pulling or pushing horizontally on the tube 12 moves the slider 18 to either side of the code fixture 10 for the purpose of positioning it properly for encoding either polarity of magnetic areas (e.g., FIGS. 5, 10). There is also a center position between the North and South locations where the slider 18 is placed to load and unload the key 20 and when the fixture 10 is not in use (e.g. FIGS. 3, 14). Note at the center position the tools 14, 16 do not protrude past the sides of the fixture 10.

Securing the tube 12 to the sliding member 18 has the additional benefit that the proper tool 14 or 16 is extended outside the edge of the fixture 10 and is easy for the person doing the encoding to pull it out of the fixed tube 12 for use to encode the hole array on that side of the of the code template 22 (FIG. 5). After returning the magnet tool 14 or 16 into the tube 12 the sliding member 18 carrying the inserted key 20 can be pushed horizontally across the fixture 10 to the corresponding position on the opposite side of the fixture 10 where the magnet tool 14 or 16 for that polarity of encoding is extended for easy withdrawal from the tube 12 and available for replacement into the tube 12 when the encoding of that side has been completed (FIGS. 9–13).

Figure 4:
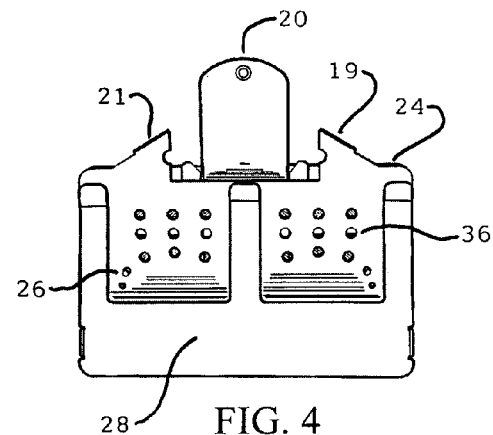
FIG. 4 is a front view showing insertion of a key to be coded in the center position of a slider of the device.
Figure 17:
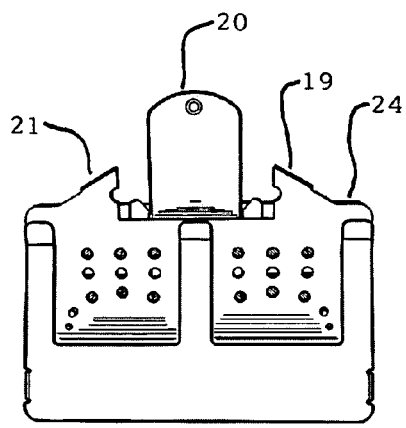
FIG. 17 shows removing the encoded key from the sliding member.

The front plate 24 also includes a pair of angle brackets 19, 21 (FIGS. 3, 4) which serve to capture the key 20 in the left and right encoding positions (e.g., FIGS. 9, 11) to restrict any movement and prevent the key 20 from falling out of the fixture 10, e.g. if the fixture is tilted backwards. At the center position the angled brackets 19, 21 do not surround the key 20 and it is freely removable or insertable (FIGS. 4, 17).

Figures 11, 12:
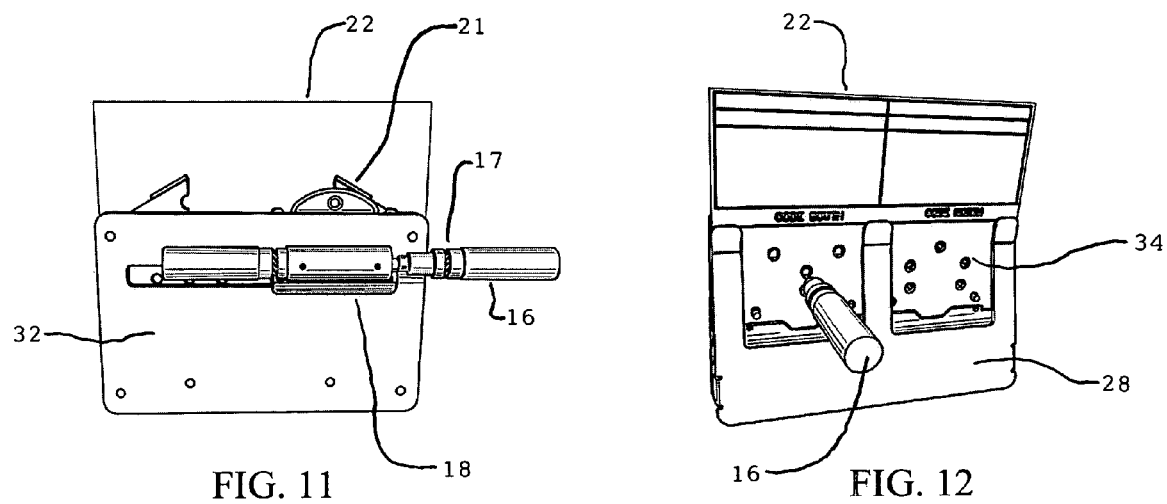
FIG. 11 shows pulling the red banded (South) magnet tool from the mounting tube.
FIG. 12 shows use of the red tool to encode South magnet areas on the inserted key.

Then encoding is done by simply touching the tip end of the magnetic tool 14 or 16 to the surface of the key 20 through a hole 34 in the code template 22 and the corresponding aligned hole 36 in the plate 24 that covers the key 20 in the fixture 10 (FIGS. 8, 12). Other hole 36 pattern front plates 24 can be installed on the code fixture 10 without any other change to the fixture 10, so that keys 20 using other array position of magnet areas can be encoded by the same fixture 10 by simply changing the front plate 24 containing the two arrays of holes. To facilitate correct alignment of the code template 22 to the code fixture 10, registration pins 26 in the fixture 10 are positioned in corresponding holes in the code template 22 prior to encoding each array. It has been necessary in the past to hold the code template on the surface of the code fixture 10 or it could fall off during the encoding process.

Figure 15:
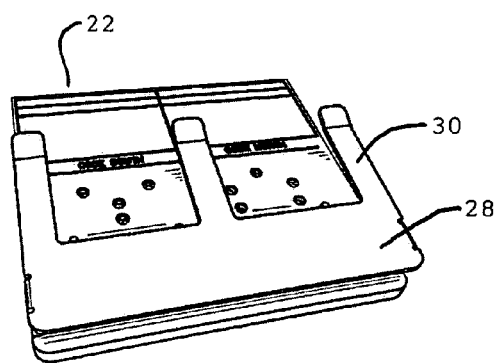
FIG. 15 shows opening the clip to remove the code template.
Figure 16:
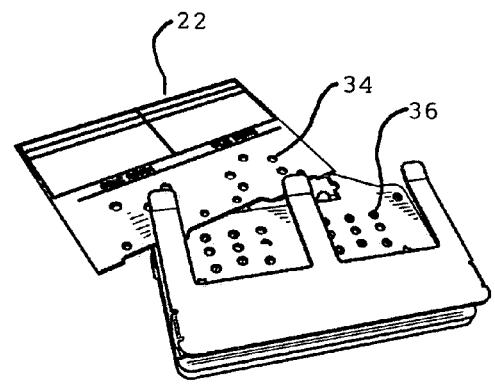
FIG. 16 shows removing the code template from the fixture.

The spring clip 28 that holds the code template 22 in place is situated across the bottom of the front of the code fixture 10 and by pressing the clip 28 with a thumb the retaining arms 30 move away from the surface of the fixture 10 so that the code template can be inserted and positioned over the registration pins. When the clip 28 is released its arms 30 contact the code template 22 and hold it on the surface 24 of the fixture 10 during the encoding process. When completed the clip 28 is again opened and the code template 22 removed (FIGS. 15, 16).

Figure 2:
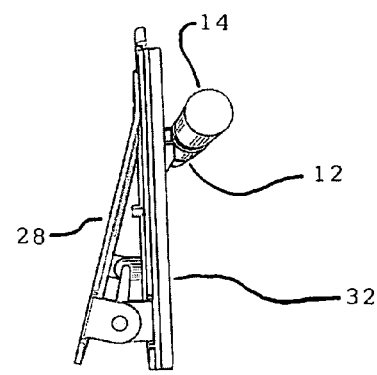
FIG. 2 is a side elevation view of the device.
Figure 3:
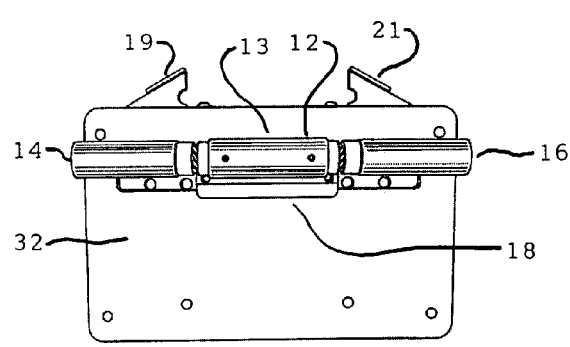
FIG. 3 is a rear view of the device.

The clip 28 is pivoted so as to open when the outside plate of the clip 28 is pressed and a spring biases the clip 28 shut when not opened. The bottom edge of the clip 28 is positioned forward of the code fixture 10 base plate 32 and provides means to stand the entire code fixture 10 upright on a table when not in use to conserve table top space (FIG. 2).

Figure 18:
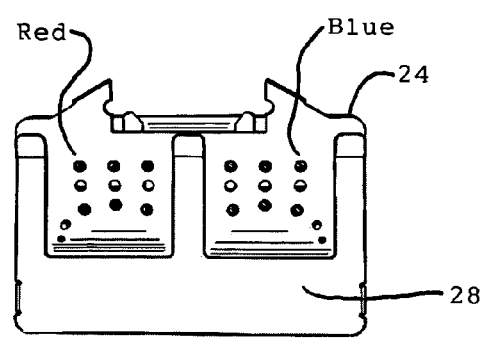
FIG. 18 is a view of the front of the empty code fixture without a key inserted showing polarity-identifying colors visible through front plate holes; and, FIG. 19 shows the key in the slider in the North position and the blue color plate behind the key can no longer be seen.
Figure 19:
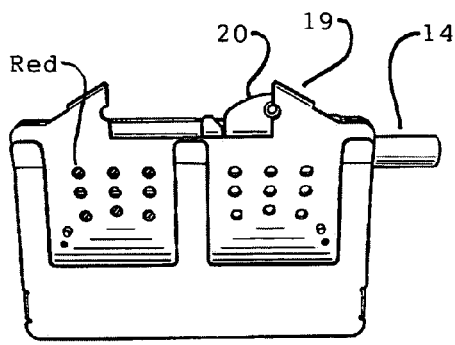

As best shown in FIG. 18, the base plate 32 behind the holes 36 is painted blue on the North side and red on the South side, so if no key 20 is inserted the blue or red colors show through the holes 36 and show that there is no key 20 at that location. This helps to prevent the situation where the person doing the coding forgets to slide the card 20 to the opposite side and encodes empty holes 36 in the code fixture 10. If either the blue or red color shows through the holes 34 in the code template 22 there is no key 20 in that position and that side should not be coded.

The three positions of the slider carrier 18, center, North and South are defined by ball detents (not shown) in the carrier 18. Thus when in any of the three positions, the slider 18 is accurately held in position and will not move from that position until pushed to one of the other positions.

Having described the structure of the preferred embodiment it is now possible to describe its function, operation and use. FIGS. 4–17 show the sequence of steps in mechanically encoding the magnetic card in accordance with the present invention. First a code template 22 is inserted into the fixture 10 in front of the front plate 24 and located by the two (2) registration pins 26 and held in place by the clip 28 (FIG. 6), and a card key 20 is inserted into the sliding holder 18 (FIG. 4). Then the combination card holder 18 and tool holder 18 is slid to one side such that the blue-coded North tool 15 protrudes past the edge of the base plate 32 for easy access of the correct tool 15 (FIGS. 5, 7). Then the tool 14 is removed from the tool holder 12 and placed through the holes 34 in the code template 22 (and the front plate 24) to contact the card key 20 and magnetically encode it, this step repeated for each of the holes 34 in the template 22 (FIG. 8). Note at this position the key 20 is retained in the sliding holder 18 by the angled bracket 19 (FIG. 9).

Figures 9, 10:
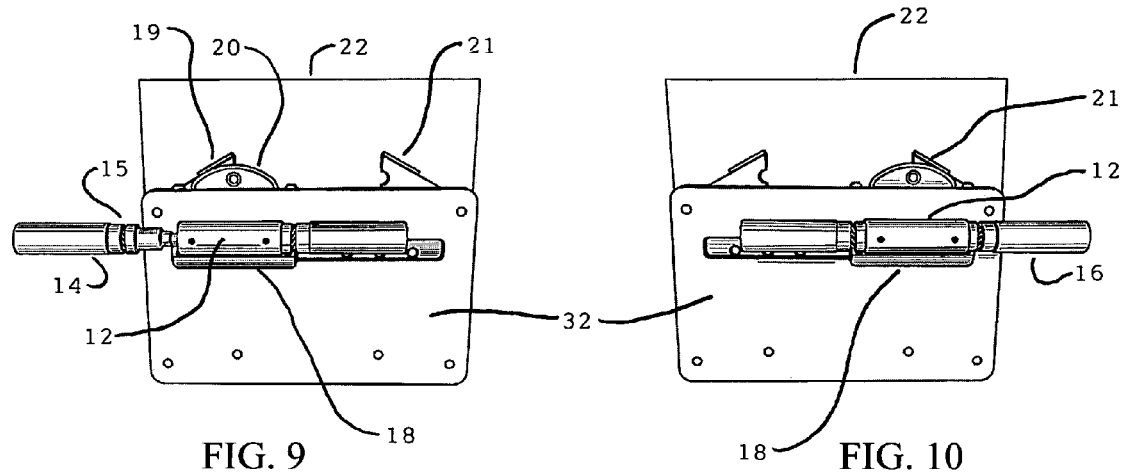
FIG. 9 shows replacing of the blue magnet tool into a tube on the rear of the code fixture.
FIG. 10 shows pushing the slider carrying the inserted key to the opposite side of the fixture in order to code the South magnetic areas on the key.
Figure 13:
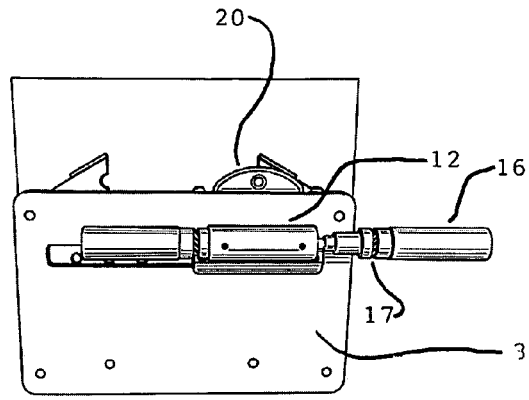
FIG. 13 shows replacing the tool in the tube after encoding all South magnetic areas.
Figure 14:
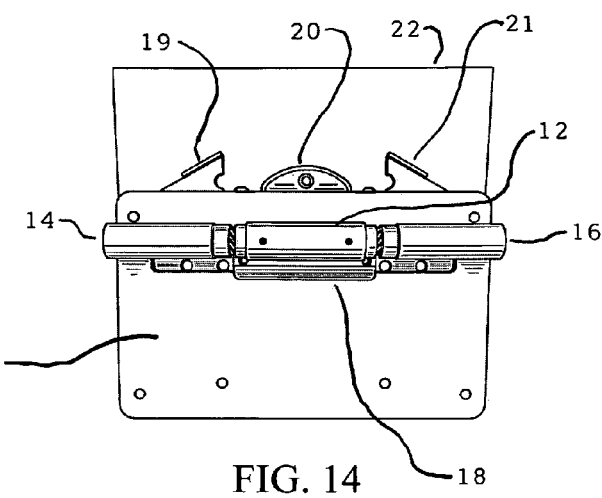
FIG. 14 shows returning the slider with inserted key to the center position.

Then the tool 14 is replaced in the holder 12 and slid across the fixture to the other side (FIGS. 9, 10). Here the key 20 is retained by the other angled bracket 21 (FIGS. 10, 11). The red-coded 17 South tool 16 is removed and used to complete coding of the key 20 (FIGS. 11, 12). The South tool 16 is replaced and the holder 12 slid back to the center position (FIGS. 13, 14). Then the three retaining arms 30 of the clip 28 may be opened and the template 22 removed (FIGS. 15, 16), and the coded card key 20 removed clear of the angled brackets 19, 21 (FIG. 17).

While the present invention has been described with regards to particular embodiments, it is recognized that additional variations of the present invention may be devised without departing from the inventive concept. For example, although the term plate is used throughout, no particular material or thickness is intended to be defined. Another example, although certain steps in a certain order were outlined above as a way to use the invention, those steps and their order may vary. The invention is defined by the claims which follow.

What is claimed is:

1. A fixture for magnetically coding a card key comprising:
   a front plate with an area for North magnetic polarity coding and an area for South magnetic polarity coding, and each area having a multiplicity of apertures;
   a North permanent magnet encoding tool and a South permanent magnet encoding tool, said encoding tools sized to be inserted into said apertures in the front plate; and,
   a card key holder moveably connected to said fixture for placing said card key proximate said North or South portion of the front plate;
   whereby the card key is magnetically coded by the encoding tools.

2. The fixture of claim 1 further comprising one or more registration pins on the fixture, whereby a code template with index hole(s) may be aligned to the fixture.

3. The fixture of claim 1 further comprising a code template having a plurality of apertures which correspond to selected apertures in said front plate and attachable to the front plate.

4. The fixture of claim 1 wherein the card key holder is slidably connected to the fixture.

5. The fixture of claim 1 further comprising a magnetic encoding tool holder connected to the fixture for storing the permanent magnetic encoding tools when not in use.

6. The fixture of claim 5 wherein said tool holder is moveably connected to the fixture between positions proximate the North and South areas of the front plate and configured such that at said positions only one of the encoding tools protrudes out from the fixture for easy access.

7. The fixture of claim 5 wherein said tool holder is slidably connected to the fixture.

8. The fixture of claim 6 wherein the card key holder and tool holder are coupled together.

9. The fixture of claim 7 wherein the card key holder and tool holder are coupled together.

10. The fixture of claim 4 further comprising a base plate located behind the front plate that is one color behind the apertures in the North area of the front plate and a different color behind the apertures in the South area of the front plate.

11. The fixture of claim 1 further comprising a clip connected to the fixture, whereby a code template may be attached to the front plate.

12. The fixture of claim 5 wherein the tool holder further comprises a magnet to attract and retain the encoding tools.

13. The fixture of claim 1 wherein the North and South encoding tools are coded different colors for identification purposes.

14. The fixture of claim 1 further comprising at least one bracket connected to the fixture which retains the card key when located proximate the North or South areas of the front plate.

15. A device for magnetically coding a card key comprising:
- a front plate having an area for North magnetic polarity coding and an area for South magnetic polarity coding, and each area having a multiplicity of holes;
- a North permanent magnet encoding tool and a South permanent magnet encoding tool, the encoding tools sized to be inserted into the holes in the front plate;
- a card key holder slidably connected to the device for placing the card key proximate the North or South areas of the front plate; and,
- a magnetic encoding tool holder coupled to the card key holder for storing the permanent magnetic encoding tools when not in use.

16. The device of claim 15 further comprising a code template having a plurality of holes which correspond to selected holes in the front plate and attachable to the front plate.

17. The device of claim 15 wherein the device is configured such that when the card key holder is proximate the North area of the front plate the North encoding tool protrudes out from the device for easy access, and when the card key holder is proximate the South area of the front plate the South encoding tool protrudes out from the fixture for easy access.

18. The device of claim 16 further comprising a clip connected to the device for attaching the code template to the front plate.

19. The device of claim 18 wherein the clip together with the device form an upright stand for the device.

20. The device of claim 15 further comprising a pair of angled brackets connected to the device which retain the card key when located proximate the North or South areas of the front plate.

* * * * *